UNITED STATES PATENT OFFICE.

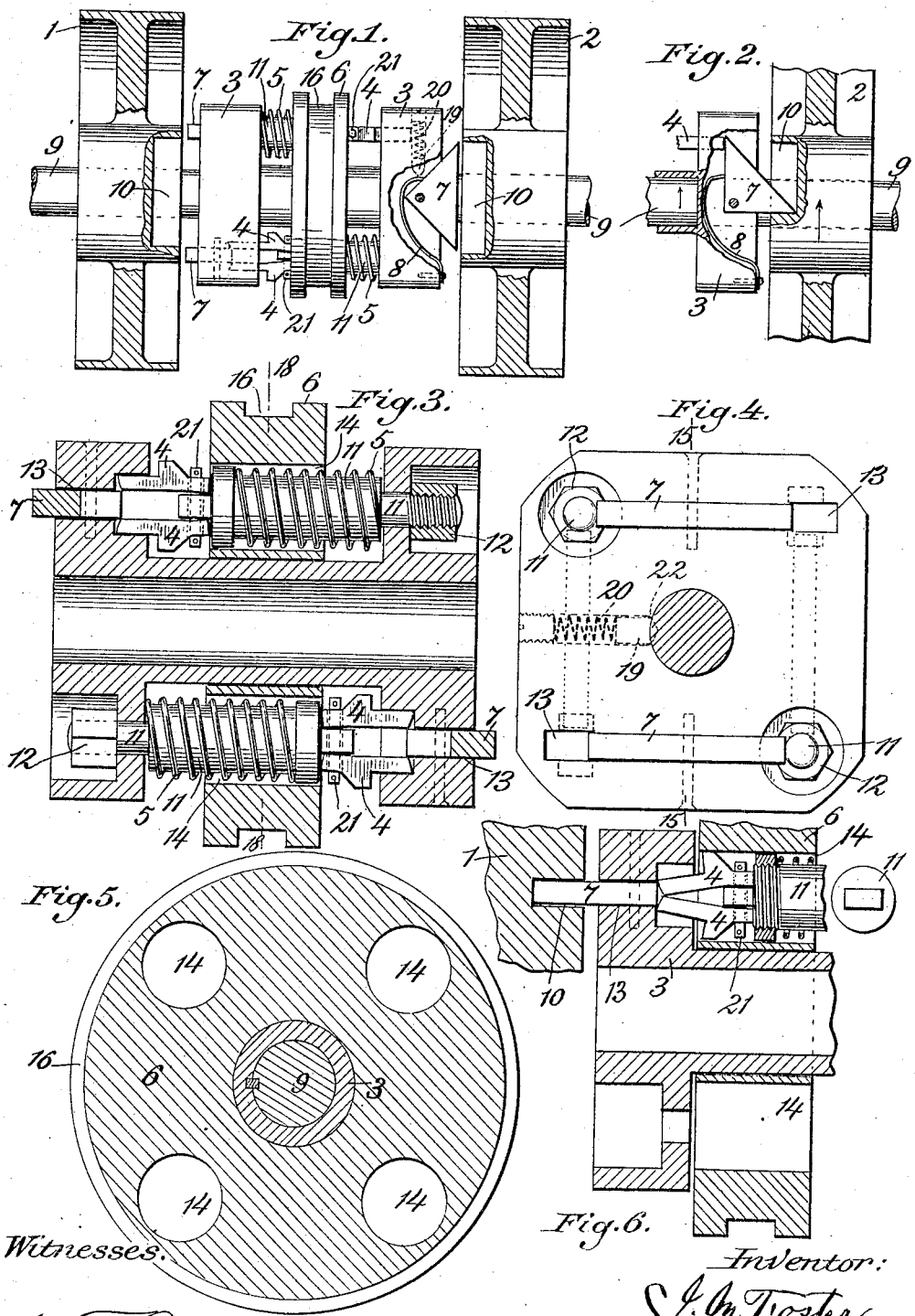

ISAAC M. FOSTER, OF WEST COVINGTON, KENTUCKY.

CLUTCH FOR COUNTER-SHAFTS.

No. 852,057.

Specification of Letters Patent.

Patented April 30, 1907.

Application filed December 11, 1905. Serial No. 291,199.

*To all whom it may concern:*

Be it known that I, ISAAC M. FOSTER, a citizen of the United States, residing at West Covington, in the county of Kenton and State of Kentucky, have invented certain new and useful Improvements in Clutches for Counter-Shafts, of which the following is a full, clear, and exact description, reference being had to the accompanying drawings, forming part of this specification.

My invention is an improved and positive clutch for counter-shafts for driving machinery, such as lathes, milling machines, boring machines and such other machinery that is under the strain of heavy loads.

My invention is an improved compact and rigid clutch, which can be engaged to or disengaged from driving member at any rate of speed.

In all, the construction and operation of the clutch will be shown in the specifications and drawings.

In the accompanying drawings Figure 1 is a view of my improved clutch showing the position of the clutch in relation to its drivers. Fig. 2 is a sectional view showing the clutch in engagement with its driver. Fig. 3 is an enlarged vertical view through the center of the clutch, on line 15 of Fig. 4. Fig. 4 is an enlarged end view of the clutch body. Fig. 5 is an enlarged view through the center of Fig. 3 on line 18. Fig. 6 is a sectional view of the mechanism that locks and releases the members which come into contact with the drivers. Said figure shows the mechanism in engagement.

The same numbers of reference are used to indicate identical parts in all figures.

In the drawings, 1 and 2 represent a pair of pulleys driven from a line shaft, (not shown), one being driven forward and one backward by means of a crossed belt. The aforesaid pulleys are loosely mounted upon a shaft 9, having its bearings in suitable brackets (not shown).

Feathered upon the shaft 9, and between pulleys 1 and 2 is a clutch, composed of body portion 3, carrying four triangularly-shaped members 7, pivoted in slots 13 of the clutch body 3, said slots being shown in Figs. 2, 3 and 4. The triangularly-shaped members 7 are not claimed in this case as they are heretofore claimed in Foster Patent No. 770,057, September 13, 1904.

The driving members 1 and 2 are provided with recesses 10, as shown in Figs. 1 and 2, and are adapted to engage triangularly-shaped members 7, when said triangularly-shaped members are placed in operating engagement. Thus it will be readily understood that the triangularly-shaped members 7 coming into contact with the drivers 1 or 2 causes the shaft 9 to rotate with the drivers. The aforesaid triangularly-shaped members 7 are normally held, when clutch is not in engagement, by means of springs 8, as shown in Fig. 1. When the clutch is in engagement with the drivers, springs 8 are forced back by the triangularly-shaped members 7, as shown in Fig. 2; while the release of the clutch from the drivers allows the springs 8 to move forward and bring triangularly-shaped members 7 back to their normal position.

The triangularly-shaped members 7 are engaged to and disengaged from driving members 1 and 2 in the following manner. It will be understood, as heretofore stated, that clutch body 3 is feathered upon shaft 9 and can be shifted in either direction. Feathered upon the clutch body 3 is a collar 6 provided with four circular openings 14 through which studs 11 pass. Fitted into groove 16 of collar 6 is a shifting lever (not shown), which acts as a shifter for both the collar 6 and clutch body 3. Collar 6 is shifted along clutch body 3 until pawls 4 are encircled by circular openings 14, thus closing said pawls 4. The closing of pawls 4 forms a compact surface against which one of the triangularly-shaped members 7 is thrown when engaging with the driver; thus it will be understood that the function of pawls 4 is to check the backward motion of triangularly-shaped members 7. An additional pressure on the shifting lever will shift the clutch body 3 and engage triangularly-shaped members 7 with the drivers 1 or 2. The triangularly-shaped members 7 are disengaged from the driving members by simply shifting the collar 6 and clutch body 3 back to central position. The clutch body 3 is held stationary on shaft 9 when in central position, by means of pin 19 and spring 20. When clutch is in central position, pin 19 drops into a countersink 22, in shaft 9; a light pressure on the shifting lever (not shown) causes pin 19 to be forced upward and out of the countersink 22 and allows the clutch to be moved toward the drivers 1 or 2.

In engaging the triangularly-shaped members 7 with the drivers 1 or 2, naturally considerable jar would be created; this, however, is remedied by springs 5, the function of which is to act as cushions, which resist and retard the sudden backward movement of pawls 4, when coming into contact with triangularly-shaped members 7.

It will be readily understood that springs 5, shown in Fig. 3, would lift studs 11 too far to allow pawls 4 to connect rightly with triangularly-shaped members 7, so the lift of springs 5 is determined by nuts 12.

In Fig. 6, it is shown how pawls 4 lock the triangularly-shaped members 7. As shown, pawls 4 are loosely fastened to the ends of studs 11 by pins 21. The opening through which pin 21 passes is somewhat larger than the pin, thus allowing free movement. As shown in Fig. 6, collar 6 has been shifted until pawls 4 are forced into circular openings 14, thus the outermost ends of said pawls are brought tightly together. Triangularly-shaped members 7 next coming into contact with drivers 1 or 2, are thrown back against pawls 4, the sudden backward movement of said triangularly-shaped members is checked as more fully described heretofore, and the clutch and shaft begin to move with the driver. In unlocking the pawls 4 from the triangularly-shaped members 7, it is simply necessary to shift collar 6 back to central position. The surrounding pressure being removed from pawls 4, the pressure of triangularly-shaped members 7 will open pawls 4 and the triangularly-shaped members being freed, the drivers will run loose from the clutch.

Having thus described my invention, I claim:

1. A positive clutch, comprising, in combination with driving and driven members, a clutch body provided with a plurality of triangularly-shaped members which connect the driving and driven members; a plurality of pawls for resisting backward motion of said triangularly-shaped members when in engagement with said driving member; a plurality of studs for sustaining said pawls; a sliding collar mounted in central position of the clutch body for the purpose of bringing the said pawls into resisting position with respect to said triangularly-shaped members, substantially as described.

2. A clutch for driving counter-shafts, comprising, in combination with driving and driven members, a clutch body provided with a plurality of triangularly-shaped members which connect said clutch to said drivers; pawls mounted on the ends of said studs for the purpose of resisting backward motion of said triangularly-shaped members when in engagement with said drivers; said pawls also constituting the means by which the clutch is released from the said drivers, substantially as heretofore described.

3. A clutch for driving counter-shafts, comprising, in combination with driving and driven members, a clutch body, a plurality of triangularly-shaped members, a plurality of pawls mounted on a plurality of studs with respect to said triangularly-shaped members; a sliding collar mounted on said clutch body, said collar being provided with circular openings to receive said pawls, and bring them into resisting position with respect to said triangularly-shaped members; substantially as heretofore described.

4. A driving clutch comprising, in combination with driving and driven members, a clutch body, a plurality of triangularly-shaped members, a plurality of pawls mounted on a plurality of studs, four of said studs, a sliding collar mounted in central position with respect to said clutch body, a plurality of springs on said studs for the purposes heretofore shown, substantially as described.

5. A clutch for driving counter-shafts, comprising, in combination with driving and driven members, a clutch body, a plurality of triangularly-shaped members, a plurality of pawls, a plurality of studs carrying said pawls, a plurality of springs on said studs for preventing jar when clutch is engaging with said driver, a collar mounted in central position with respect to said clutch body, said collar being provided with circular openings through which said studs pass, said circular openings constituting the means by which said pawls are brought to resisting position with respect to said triangularly-shaped members and springs secured to said clutch body and bearing on said triangularly-shaped members to bring said triangularly-shaped members to normal position for engagement after being released from the said drivers, substantially as described.

I. M. FOSTER.

Witnesses:
H. T. COLLINS,
Mrs. J. BRENNER.